(12) United States Patent
Jochim et al.

(10) Patent No.: US 12,506,730 B2
(45) Date of Patent: Dec. 23, 2025

(54) MESSAGE AUTHENTICATION SYSTEM FOR A VEHICLE NETWORK BASED ON A SECURITY PROXY NODE

(71) Applicant: GM Global Technology Operations LLC, Detroit, MI (US)

(72) Inventors: Markus Jochim, Troy, MI (US); Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 421 days.

(21) Appl. No.: 18/149,254

(22) Filed: Jan. 3, 2023

(65) Prior Publication Data
US 2024/0223552 A1    Jul. 4, 2024

(51) Int. Cl.
*H04L 9/40* (2022.01)
(52) U.S. Cl.
CPC ........ *H04L 63/083* (2013.01); *H04L 63/0281* (2013.01)

(58) Field of Classification Search
CPC . H04L 63/083; H04L 63/0281; H04L 63/123; H04W 12/106; H04W 12/009; H04W 4/40
See application file for complete search history.

(56) References Cited

U.S. PATENT DOCUMENTS

| | | | |
|---|---|---|---|
| 9,705,678 B1* | 7/2017 | Wang | G06F 21/602 |
| 2007/0121618 A1* | 5/2007 | Hirano | H04W 40/02 |
| | | | 709/240 |
| 2024/0007297 A1* | 1/2024 | Lim | H04L 9/40 |

\* cited by examiner

*Primary Examiner* — Thaddeus J Plecha
(74) *Attorney, Agent, or Firm* — Vivacqua Crane, PLLC (57) ABSTRACT

A message authentication system for a vehicle network includes a private communication system including one or more private nodes in electronic communication with one another. The message authentication system also includes a public communication system including a plurality of public nodes in electronic communication with one another. The plurality of public nodes includes a security proxy node and one or more receiving nodes. The security proxy node authenticates one or more unique messages transmitted by a private node of the private communication system to the one or more receiving nodes of the public communication system.

19 Claims, 4 Drawing Sheets

MESSAGE AUTHENTICATION SYSTEM FOR A VEHICLE NETWORK BASED ON A SECURITY PROXY NODE

INTRODUCTION

The present disclosure relates to a message authentication system for a vehicle network. More particularly, the message authentication system includes a security proxy node that authenticates one or more unique messages forwarded from a private communication system to a public communication system.

A vehicle network may be employed for exchanging messages between various smart sensors, smart actuators, and electronic control modules that are part of a vehicle. In one example, the vehicle network may include both a private communication system and a public communication system. The private communication system includes one or more private nodes, and the public communication system includes one or more public nodes. Unlike the public communication system, messages exchanged between the private nodes that are part of the private communication system do not require authentication.

In one approach, the public communication system may include a gateway node for authenticating the messages received from the private communication system. The gateway node receives an original message from the private communication system. A security module, which is part of the gateway node, generates a message authentication code that corresponds to the original message received from the private communication system. The gateway node may then transmit a message that is a concatenation of the original message received from the private communication system and the corresponding message authentication code to the subsequent public nodes that are part of the public communication system. It is to be appreciated that numerous messages are exchanged over the vehicle network, and the gateway module is responsible for generating message authentication codes for the messages received from the private communication system. Generating a corresponding message authentication code for all of the messages received from the private communication system may become computationally intensive for the processors and the security module that are part of the gateway node.

Thus, while vehicle networks achieve their intended purpose, there is a need in the art for an improved approach for authenticating messages received from a private communication system.

SUMMARY

According to several aspects, a message authentication system for a vehicle network is disclosed. The message authentication system includes a private communication system including one or more private nodes in electronic communication with one another, and a public communication system including a plurality of public nodes in electronic communication with one another. The plurality of public nodes includes a security proxy node and one or more receiving nodes. The message authentication system computes, by a private node that is part of the private communication system, a cryptographic hash corresponding to one or more unique messages, where the cryptographic hash and the one or more unique messages are transmitted to the security proxy node. The message authentication system transmits, by the security proxy node, the one or more unique messages to the one or more receiving nodes. The message authentication system determines, by the security proxy node, a message authentication code for the cryptographic hash. The message authentication system transmits, by the security proxy node, a concatenation of the cryptographic hash and the message authentication code for the cryptographic hash to the one or more receiving nodes. The message authentication system consumes, by the one or more receiving nodes, the one or more unique messages in response to determining the message authentication code for the cryptographic hash is valid and confirming the message authentication code for the cryptographic hash corresponds to the cryptographic hash.

In another aspect, the message authentication system determines the message authentication code for the cryptographic hash is valid by determining, by the one or more receiving nodes, the message authentication code for the cryptographic hash is a valid message authentication code that originates from the security proxy node.

In yet another aspect, the message authentication system performs the following: in response to determining the message authentication code for the cryptographic hash is a valid message authentication code that originates from the security proxy node, compare, by the one or more receiving nodes, the message authentication code for the cryptographic hash against the one or more unique messages to confirm the message authentication code for the cryptographic hash and the one or more unique messages correspond to one another.

In an aspect, the message authentication system performs the following: transmit, by a switch of the security proxy node, the one or more unique messages over the public communication system to a switch corresponding to the one or more receiving nodes, and allow, by a switch of the one or more receiving nodes, the one or more unique messages to be available to one or more computing devices of the one or more receiving nodes.

In another aspect, the security proxy node determines the message authentication code for the cryptographic hash by making the cryptographic hash available to one or more computing devices of the security proxy node by a corresponding switch, and determining, by a security module of the security proxy node, the message authentication code for the cryptographic hash, wherein the one or more computing devices of the security proxy node obtains the message authentication code for the cryptographic hash from the security module of the security proxy node.

In yet another aspect, the one or more private nodes lack support for message authentication.

In an aspect, the one or more private nodes include one or more of the following: a smart actuator, a smart sensor, and an electronic control unit with an input/output (I/O) interface.

In another aspect, message authentication system for a vehicle network is disclosed, and includes a private communication system including one or more private nodes in electronic communication with one another, and a public communication system including a plurality of public nodes in electronic communication with one another, where the plurality of public nodes includes a security proxy node and one or more receiving nodes. The message authentication system transmits, by a private node that is part of the private communication system, one or more unique messages to the security proxy node. The message authentication system transmits, by the security proxy node, the one or more unique messages to the one or more receiving nodes. The message authentication system consumes, by the more receiving nodes, the one or more unique messages. The message authentication system computes, by the private node, a cryptographic hash corresponding to the one or more unique messages. The message authentication system transmits, by the private node, the cryptographic hash to the security proxy node. The message authentication system determines, by the security proxy node, a message authentication code for the cryptographic hash. The message authentication system transmits, by the security proxy node, a concatenation of the cryptographic hash and the message authentication code for the cryptographic hash to the one or more receiving nodes. The message authentication system determines, by the one or more receiving nodes, the message authentication code for the cryptographic hash is a valid message authentication code that originates from the security proxy node. The message authentication system compares, by the one or more receiving nodes, the message authentication code for the cryptographic hash against the one or more unique messages to confirm the message authentication code for the cryptographic hash and the one or more unique messages correspond to one another. In response to confirming the message authentication code for the cryptographic hash and the one or more unique messages do not correspond to one another, the message authentication system refuses to accept further messages from both the security proxy node and the private nodes by the one or more receiving nodes.

In yet another aspect, the message authentication system performs the following: in response to confirming the message authentication code for the cryptographic hash and the one or more unique messages correspond to one another, continue to accept messages from both the security proxy node and the private nodes by the one or more receiving nodes.

In an aspect, the message authentication system performs the following: transmit, by a switch of the security proxy node, the one or more unique messages over the public communication system to a switch corresponding to the one or more receiving nodes, and allow, by a switch of the one or more receiving nodes, the one or more unique messages to be available to one or more computing devices of the one or more receiving nodes.

In another aspect, the security proxy node determines the message authentication code for the cryptographic hash by making the cryptographic hash available to one or more computing devices of the security proxy node by a corresponding switch, and determining, by a security module of the security proxy node, the message authentication code for the message authentication code for the cryptographic hash. The one or more computing devices of the security proxy node obtains the cryptographic hash from the security module of the security proxy node.

In yet another aspect, the one or more private nodes lack support for message authentication.

In an aspect, the one or more private nodes include one or more of the following: a smart actuator, a smart sensor, and an electronic control unit with an input/output (I/O) interface.

In another aspect, a message authentication system for a vehicle network is disclosed, and includes a private communication system including one or more private nodes in electronic communication with one another, and a public communication system including a plurality of public nodes in electronic communication with one another, where the plurality of public nodes includes a security proxy node and one or more receiving nodes. The message authentication system computes, by the security proxy node, a random hash. The message authentication system determines, by the security proxy node, a message authentication code for the random hash. The message authentication system transmits, by the security proxy node, the random hash and the message authentication code for the random hash over the public communication system to the one or more receiving nodes. The message authentication system transmits, by the security proxy node, the random hash to a private node, where the private node transmits one or more unique messages to the one or more receiving nodes. The message authentication system computes, by the private node, padding information based on a trapdoor key for a cryptographic hash, where the padding information is selected to make the cryptographic hash equal to the random hash. The message authentication system transmits, by the private node, a concatenation of one or more unique messages and the padding information to the one or more receiving nodes. The message authentication system consumes, by the one or more receiving nodes, the one or more unique messages in response to determining a message cryptographic hash of the concatenation of the one or more unique messages and the padding information is equal to the random hash and that the message authentication code for the random hash is a valid message authentication code that originates from the security proxy node.

In yet another aspect, the message authentication system performs the following: in response to determining the message cryptographic hash is not equal to the of the random hash, determine, by the one or more receiving nodes, the one or more unique messages are inconsumable.

In an aspect, the message authentication system performs the following: in response to determining the message authentication code for the random hash is not a valid message authentication code that originates from the security proxy node, determine, by the one or more receiving nodes, the one or more unique messages are inconsumable.

In another aspect, the random hash is identical to the cryptographic hash.

In yet another aspect, the trapdoor key for the cryptographic hash is saved in memory of the private node.

In an aspect, the security proxy node computes the random hash of a random message based on a trapdoor hash function.

In another aspect, the one or more private nodes include one or more of the following: a smart actuator, a smart sensor, and an electronic control unit with an input/output (I/O) interface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
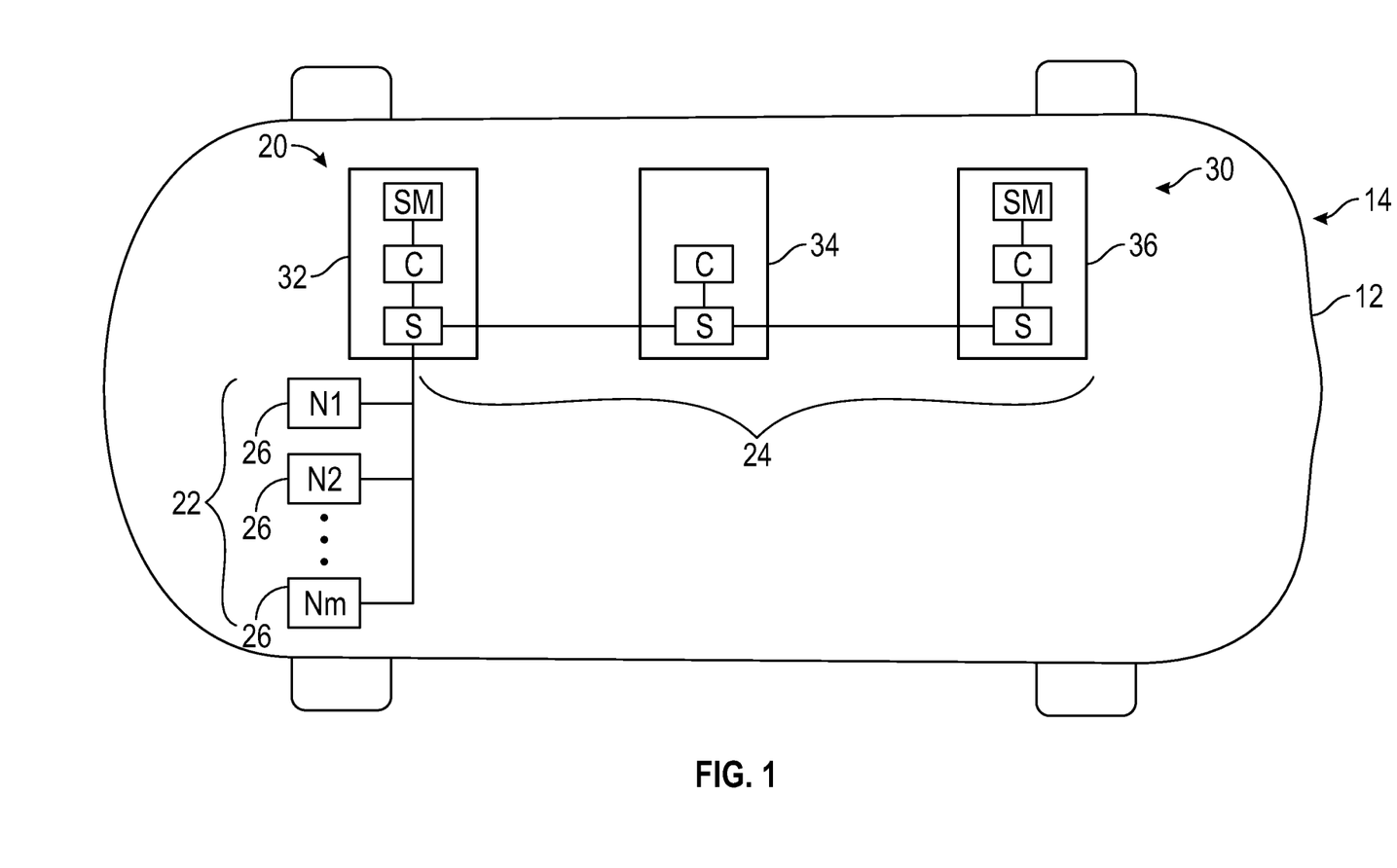
FIG. 1 is a schematic diagram of the disclosed message authentication system for a vehicle network, where the message authentication system includes a private communication system and a public communication system including a security proxy node, according to an exemplary embodiment.

Referring to FIG. 1, a vehicle 12 including an exemplary message authentication system 14 for a vehicle network 20 is illustrated. It is to be appreciated that the vehicle 12 may be any type of vehicle such as, but not limited to, a sedan, truck, sport utility vehicle, van, or motor home. The message authentication system 14 and the vehicle network 20 include a private communication system 22 and a public communication system 24 that are in electronic communication with one another. The private communication system 22 includes one or more private nodes 26 that are in electronic communication with one another based on a wired or a wireless data transmission and reception protocol. It is also to be appreciated that although FIG. 1 illustrates a vehicle network 20, the message authentication system 14 is not limited to a vehicle. Indeed, the message authentication system 14 may be used in other networks that include a public and a private communication system as well such as, for example, networks for industrial automation systems.

In the example as shown in FIG. 1, the private communication system 22 includes an m number of nodes 26. In one embodiment, the private nodes 26 represent devices with limited computational power and lack support for message authentication. That is, messages exchanged between the private nodes 26 that are part of the private communication system 22 do not require authentication. The private nodes 26 may include, for example, smart sensors, smart actuators, and electronic control units with input/output (I/O) interfaces that are part of the vehicle 12.

The public communication system 24 includes a plurality of public nodes 30 in electronic communication with one another based on a wired or a wireless data transmission and reception protocol. The plurality of public nodes 30 include a security proxy node 32, one or more middle nodes 34, and one or more receiving nodes 36, where the one or more middle nodes 34 connects the security proxy node 32 to the one or more receiving nodes 36. The security proxy node 32 receives messages from the one of the private nodes 26 of the private communication system 22, and the messages are consumed by the one or more receiving nodes 36. In other words, the one or more receiving nodes 36 utilize the messages for their respective functional purpose. Unlike the private nodes 26, the public nodes 30 of the public communication system 24 require message authentication. That is, messages communicated between the public nodes 30 that are part of the public communication system 24 require authentication. Also, messages forwarded from one of the private nodes 26 that are part of the private communication system 22 to the public communication system 24 require authentication as well. As explained below, the security proxy node 32 authenticates messages forwarded from the private communication system 22 to the public communication system 24. It is to be appreciated that several approaches exist for authenticating the messages received from the private communication system 22.

The public nodes 30 are computing devices that each include a switch S and one or more computing devices C, where the one or more computing devices C represents any type of processing unit such as, for example, a central processing unit (CPU). The switch S represents any type of switching, routing, or forwarding device that is employed in either a wired or wireless data transmission protocol. For example, in one embodiment, the public nodes 30 are in communication with one another by a switched Ethernet network and the switch S is an Ethernet switch. The switch S of a respective public node 30 receives unique messages. For example, an n number of unique messages may be provided that include unique message m1, unique message m2, and unique message mn, where n is an arbitrary number. The switch S makes the unique message available to the computing device C of the respective public node 30. The security proxy node 32 and the one or more receiving nodes 36 both include a security module SM that is implemented in either hardware or software, where the security module SM may generate message authentication codes for outgoing messages and verify message authentication codes for incoming messages. Each message authentication code corresponds to a unique message transmitted over the vehicle network 20. However, it is to be appreciated that in some embodiments a single message authentication code may be used to authenticate a batch of messages. The one or more middle nodes 34 do not include a security module SM.

One exemplary approach to verify incoming messages received from one of the private nodes 26 of the private communication system 22 by the public communication system 24 shall now be described. It is to be appreciated that any of the private nodes N1-Nm may be used to send one or more unique messages to the one or more receiving nodes 36 of the public communication system 24. The private node 26 first computes a cryptographic hash corresponding to the one or more unique messages, where the cryptographic hash is based on a concatenation of the one or more unique messages. Specifically, if there are n number of unique messages, then the cryptographic hash may be expressed as H=hash (m1∥m2∥ . . . ∥ mn), where H is the cryptographic hash and "∥" is a concatenation operator. It is to be appreciated that any type of cryptographic hash function for calculating the cryptographic hash of the one or more unique messages may be employed such as, for example, Secure Hash Algorithm 2 (SHA-2) or SHA-3.

The private node 26 that is part of the private communication system 22 transmits the one or more unique messages to the security proxy node 32 of the public communication system 24. It is to be appreciated that the one or more unique messages are transmitted from the private node 26 without a message authentication code to the security proxy node 32. The security proxy node 32 that is part of the public communication system 24 then transmits the one or more unique message over the vehicle network 20 to the one or more receiving nodes 36. Specifically, the switch S of the security proxy node 32 transmits the one or more unique messages over the public communication system 24 to the switch S corresponding to the one or more receiving nodes 36, where the switch S of the one or more receiving nodes 36 makes the one or more unique messages available to the one or more computing devices C of the one or more receiving nodes 36.

The private node 26 transmits the cryptographic hash, which corresponds to the one or more unique messages, to the security proxy node 32 of the public communication system 24. It is to be appreciated that the private node 26 may transmit the cryptographic hash in parallel with transmitting the one or more unique messages to the security proxy node 32 as described above. Specifically, the cryptographic hash is transmitted to the switch S of the security proxy node 32, and the switch S makes the cryptographic hash available to the one or more computing devices C of the security proxy node 32. The one or more computing devices C of the security proxy node 32 makes the cryptographic hash available to the security module SM of the security proxy node 32. The security module SM of the security proxy node 32 generates a message authentication code for the cryptographic hash, where the cryptographic hash corresponds to the one or more unique messages. The one or more computing devices C of the security proxy node 32 obtains the message authentication code for the cryptographic hash from the security module SM of the security proxy node 32.

The one or more computing devices C of the security proxy node 32 then transmits a concatenation of the cryptographic hash and the message authentication code for the cryptographic hash via the switch S of the security proxy node 32 over the public communication system 24 to the switch S of the one or more receiving nodes 36. The switch S of the one or more receiving nodes 36 then makes the concatenation of the cryptographic hash and the message authentication code for the cryptographic hash available to the one or more computing devices C of the one or more receiving nodes 36. It is to be appreciated that the one or more receiving nodes 36 confirms that the cryptographic hash is valid. In an embodiment, this is performed by having the one or more computing devices C of the one or more receiving nodes calculate a new cryptographic hash for the one or more unique messages, and then comparing the new cryptographic hash with the cryptographic hash received over the public communication system 24.

As explained below, the one or more receiving nodes 36 then consumes the one or more unique messages in response to determining the message authentication code for the cryptographic hash is valid and confirming the message authentication code for the cryptographic hash and the one or more unique messages correspond to one another. That is, one or more receiving nodes 36 confirms the cryptographic hash computed by the private node 26 is the correct hash value of the one or more unique messages received. Specifically, the one or more computing devices C of the one or more receiving nodes 36 interacts with the corresponding security module SM to determine the message authentication code for the cryptographic hash is a valid message authentication code that originates from the security proxy node 32. If the one or more computing devices C of the one or more receiving nodes 36 determines the message authentication code for the cryptographic hash is valid, then the one or more computing devices C of the one or more receiving nodes 36 compares the cryptographic hash received with the message authentication code to the hash of the received one or more unique messages to confirm the message authentication code and the one or more unique messages correspond to one another. That is, the one or more computing devices C of the one or more receiving nodes 36 checks to make sure the message authentication code for the cryptographic hash is the correct hash value for the one or more unique messages. In response to confirming the message authentication code for the cryptographic hash corresponds to the one or more unique messages, the one or more computing devices C of the one or more receiving nodes 36 then consumes the one or more unique messages.

It is to be appreciated that the cryptographic hash corresponding to the one or more unique messages is significantly shorter in length when compared to the actual unique messages. For example, the cryptographic hash may only be sixteen bytes in size, while the unique messages may be several times as large in size. The reduced size of the cryptographic hash results in decreased computational load on the one or more computing devices C and the security module SM of the security proxy node 32. Furthermore, it is also to be appreciated that since the unique messages are forwarded to the one or more receiving nodes 36 by the corresponding switches S of the security proxy node 32 and the one or more middle nodes 34, there is no increased computational load on the corresponding computing devices C of the nodes 32, 34.

Figure 2:
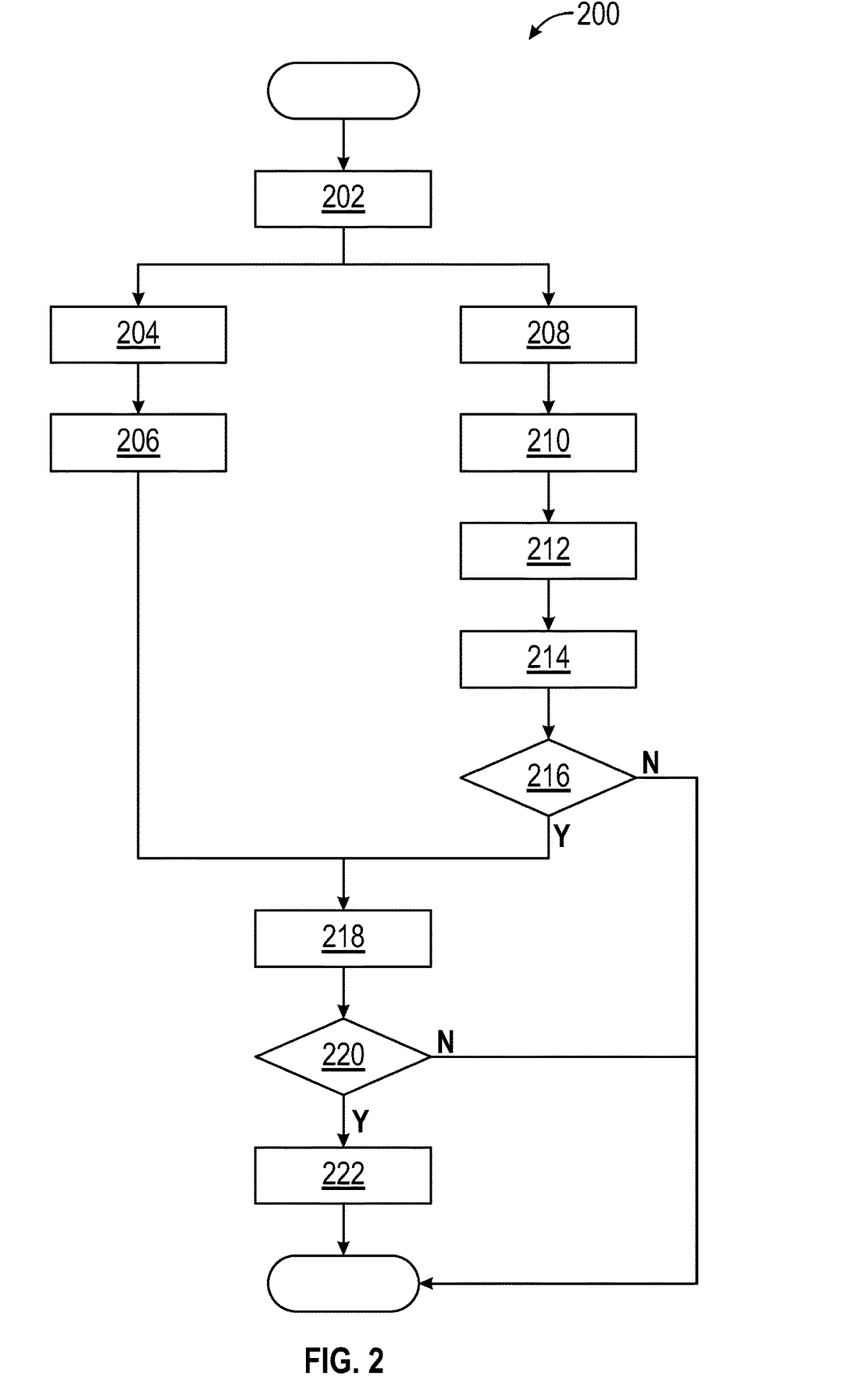
FIG. 2 is a process flow diagram illustrating a method for authenticating messages from the private communication system to the public communication system shown in FIG. 1, according to an exemplary embodiment.

FIG. 2 is an exemplary process flow diagram illustrating a method 200 for authenticating messages received by the public communication system 24 from the private communication system 22. Referring generally to FIGS. 1-2, the method 200 may begin at block 202. In block 202, the private node 26 computes the cryptographic hash corresponding to the one or more unique messages, where the cryptographic hash is based on a concatenation of the one or more unique messages. The method 200 may then proceed to block 204. As seen in FIG. 2, it is to be appreciated that block 204 and 206 that are part of the method 200 may be performed in parallel with blocks 208, 210, 212, 214, and 216.

In block 204, the private node 26 that is part of the private communication system 22 transmits the one or more unique messages to the security proxy node 32 of the public communication system 24. The method 200 may then proceed to block 206.

In block 206, the security proxy node 32 transmits the one or more unique message over the public communication system 24 to the one or more receiving nodes 36. As mentioned above, the switch S of the security proxy node 32 transmits the one or more unique messages over the public communication system 24 to the switch S corresponding to the one or more receiving nodes 36, and the switch S of the one or more receiving nodes 36 allows the one or more unique messages to be available to the one or more computing devices C of the one or more receiving nodes 36. Blocks 208, 210, 212, 214, and 216 shall now be described.

In block 208, the private node 26 transmits the cryptographic hash, which corresponds to the one or more unique messages, to the security proxy node 32 of the public communication system 24. The method 200 may then proceed to block 210.

In block 210, the security proxy node 32 determines the message authentication code for the cryptographic hash, where the cryptographic hash corresponds to the one or more unique messages. Specifically, the cryptographic hash is made available to the one or more computing devices C of the security proxy node 32 by the corresponding switch S, and the security module SM of the security proxy node 32 determines the message authentication code for the cryptographic hash. The one or more computing devices C of the security proxy node 32 obtains the message authentication code for the cryptographic hash from the security module SM of the security proxy node 32. The method 200 may then proceed to block 212.

In block 212, the security proxy node 32 transmits the concatenation of the cryptographic hash and the message authentication code for the cryptographic hash to the one or more receiving nodes 36. Specifically, the one or more computing devices C of the security proxy node 32 transmits a concatenation of the cryptographic hash and the message authentication code for the cryptographic hash via the switch S of the security proxy node 32 over the public communication system 24 to the switch S of the one or more receiving nodes 36. The switch S of the one or more receiving nodes 36 then makes the concatenation of the cryptographic hash and the message authentication code for the cryptographic hash available to the one or more computing devices C of the one or more receiving nodes 36. The method 200 may then proceed to block 214.

In block 214, the one or more receiving nodes 36 determine if the message authentication code for the cryptographic hash is a valid message authentication code that originates from the security proxy node 32. The method 200 may then proceed to decision block 216.

In decision block 216, in response to determining the message authentication code for the cryptographic hash is not a valid message authentication code that originates from the security proxy node 32, the method 200 may terminate. In response to determining the message authentication code for the cryptographic hash is a valid message authentication code that originates from the security proxy node 32, the method 200 may proceed to block 218. It is to be appreciated that the method only proceeds to block 218 once blocks 206 and 216 are complete.

In block 218, in response to determining the message authentication code for the cryptographic hash is a valid message authentication code that originates from the security proxy node 32, the one or more computing devices C of the one or more receiving nodes 36 compares the message authentication code for the cryptographic hash against the one or more unique messages to confirm the message authentication code for the cryptographic hash and the one or more unique messages correspond to one another. The method 200 may then proceed to decision block 220.

In decision block 220, in response to confirming the message authentication code for the cryptographic hash and the one or more unique messages do not correspond to one another, the method 200 may terminate. However, in response to confirming the message authentication code for the cryptographic hash and the one or more unique messages correspond to one another, the method 200 may proceed to block 222.

In block 222, the one or more computing devices C of the one or more receiving nodes 36 consumes the one or more unique messages. The method 200 may then terminate.

Figure 3:
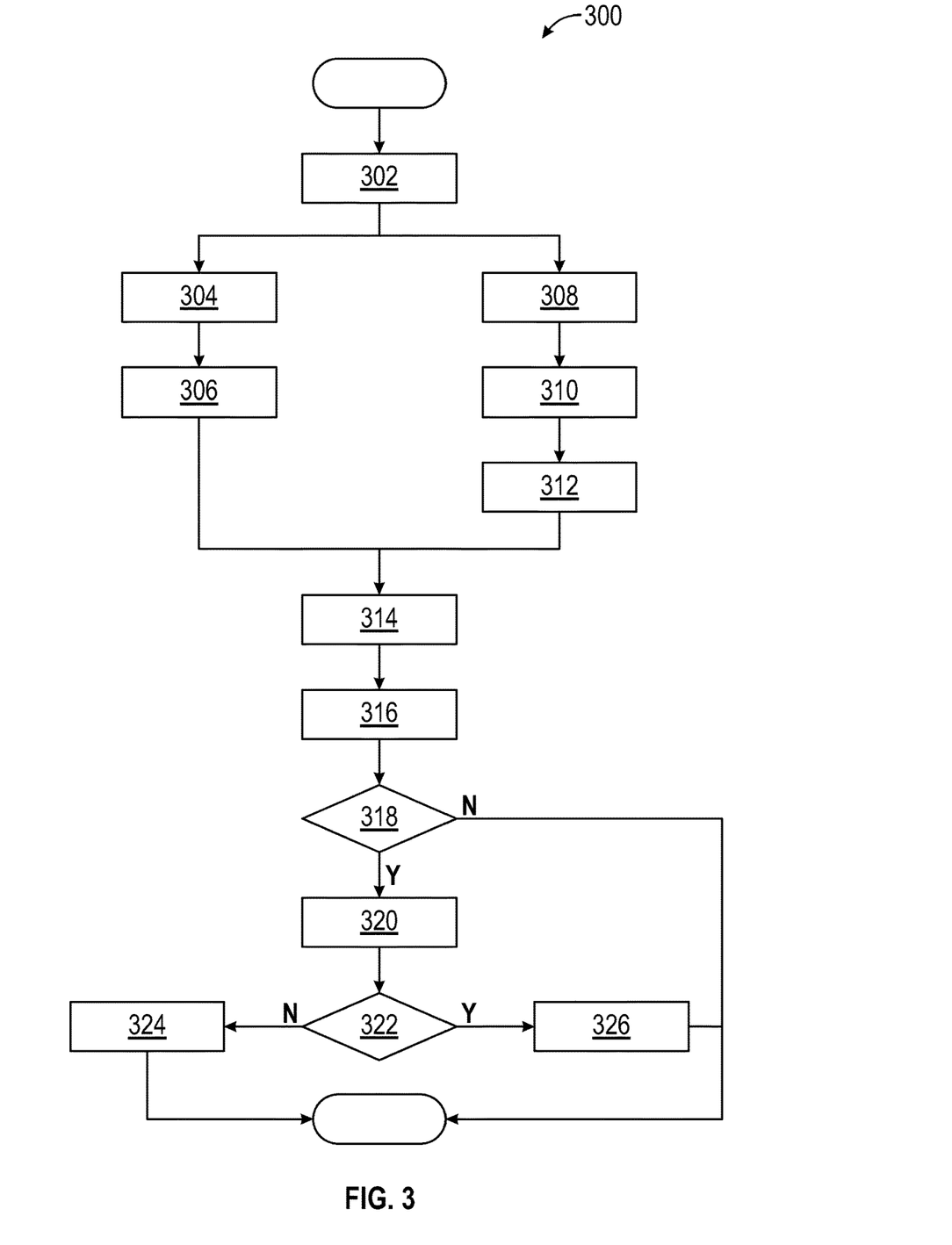
FIG. 3 is a process flow diagram illustrating another method for authenticating messages from the private communication system to the public communication system shown in FIG. 1, according to an exemplary embodiment.

FIG. 3 is another process flow diagram illustrating another method 300 for authenticating messages received by the public communication system 24 from the private communication system 22. Referring to FIGS. 1 and 3, the method 300 may begin at block 302. In block 302, the private node 26 that is part of the private communication system 22 transmits the one or more unique messages to the security proxy node 32 of the public communication system 24. It is to be appreciated that the one or more unique messages are transmitted from the private node 26 without a message authentication code to the security proxy node 32. The method 300 may then proceed to block 304. As seen in FIG. 3, it is to be appreciated that blocks 304 and 306 that are part of the method 300 may be performed in parallel with blocks 308, 310, and 312.

In block 304, the security proxy node 32 transmits the one or more unique message over the public communication system 24 to the one or more receiving nodes 36. Specifically, the switch S of the security proxy node 32 transmits the one or more unique messages over the public communication system 24 to the switch S corresponding to the one or more receiving nodes 36, where the switch S of the one or more receiving nodes 36 makes the one or more unique messages available to the one or more computing devices C of the one or more receiving nodes 36. The method 300 may then proceed to block 306.

In block 306, the one or more computing devices C of the one or more receiving nodes 36 then consumes the one or more unique messages. Blocks 308, 310, and 312 shall now be described. As seen in FIG. 3, blocks 308, 310, and 312 may be executed in parallel with blocks 304 and 306.

In block 308, after transmitting the one or more unique messages to the security proxy node 32 of the public communication system 24, the private node 26 computes the cryptographic hash corresponding to the one or more unique messages, where the cryptographic hash is based on a concatenation of the one or more unique messages. The method 300 may then proceed to block 310.

In block 310, the private node 26 transmits the cryptographic hash, which corresponds to the one or more unique messages, to the security proxy node 32 of the public communication system 24. The method 300 may then proceed to block 312.

In block 312, the security proxy node 32 determines the message authentication code for the cryptographic hash, where the cryptographic hash corresponds to the one or more unique messages. Specifically, the cryptographic hash is made available to the one or more computing devices C of the security proxy node 32 by the corresponding switch S, and the security module SM of the security proxy node 32 determines the message authentication code for the cryptographic hash. The one or more computing devices C of the security proxy node 32 obtains the message authentication code for the cryptographic hash from the security module SM of the security proxy node 32. The method 300 may then proceed to block 314. It is to be appreciated that the method only proceeds to block 314 once blocks 306 and 312 are complete.

In block 314, the security proxy node 32 transmits the concatenation of the cryptographic hash and the message authentication code for the cryptographic hash to the one or more receiving nodes 36. Specifically, the one or more computing devices C of the security proxy node 32 transmits a concatenation of the cryptographic hash and the message authentication code for the cryptographic hash via the switch S of the security proxy node 32 over the public communication system 24 to the switch S of the one or more receiving nodes 36. The switch S of the one or more receiving nodes 36 then makes the concatenation of the cryptographic hash and the message authentication code for the cryptographic hash available to the one or more computing devices C of the one or more receiving nodes 36. The method 200 may then proceed to block 316.

In block 316, the one or more receiving nodes 36 determine if the message authentication code for the cryptographic hash is a valid message authentication code that originates from the security proxy node 32. The method 300 may then proceed to decision block 318.

In decision block 318, in response to determining the message authentication code for the cryptographic hash is not a valid message authentication code that originates from the security proxy node 32, the method 300 may terminate. In response to determining the message authentication code for the cryptographic hash is a valid message authentication code that originates from the security proxy node 32, the method 300 may proceed to block 320.

In block 320, in response to determining the message authentication code for the cryptographic hash is a valid message authentication code that originates from the security proxy node 32, the one or more computing devices C of the one or more receiving nodes 36 compares the message authentication code for the cryptographic hash against the one or more unique messages to confirm the message authentication code for the cryptographic hash and the one or more unique messages correspond to one another. The method 300 may then proceed to decision block 322.

In decision block 322, in response to confirming the message authentication code for the cryptographic hash and the one or more unique messages do not correspond to one another, the method 300 may proceed to block 324. In block 324, the one or more receiving nodes 36 refuse to accept further messages from the security proxy node 32 as well as any of the private nodes 26 that are part of the private communication system 22. The method 300 may then terminate. However, in response to confirming the message authentication code for the cryptographic hash and the one or more unique messages correspond to one another, the method 300 may proceed to block 326. In block 326, the one or more receiving nodes 36 may continue to accept messages from both the security proxy node 32 and the private nodes 26 that are part of the private communication system 22. The method 300 may then terminate.

It is to be appreciated that the approach described by method 300 may be employed in applications with relatively stringent latency requirements, such as distributed real-time control algorithms. This is because the approach described by method 300 significantly reduces the latency of messages sent by the private node 26. However, it is to be appreciated that the method 300 may only be applied in applications where a small number of messages from an adversary may be accepted by the one or more receiving nodes.

Figure 4:
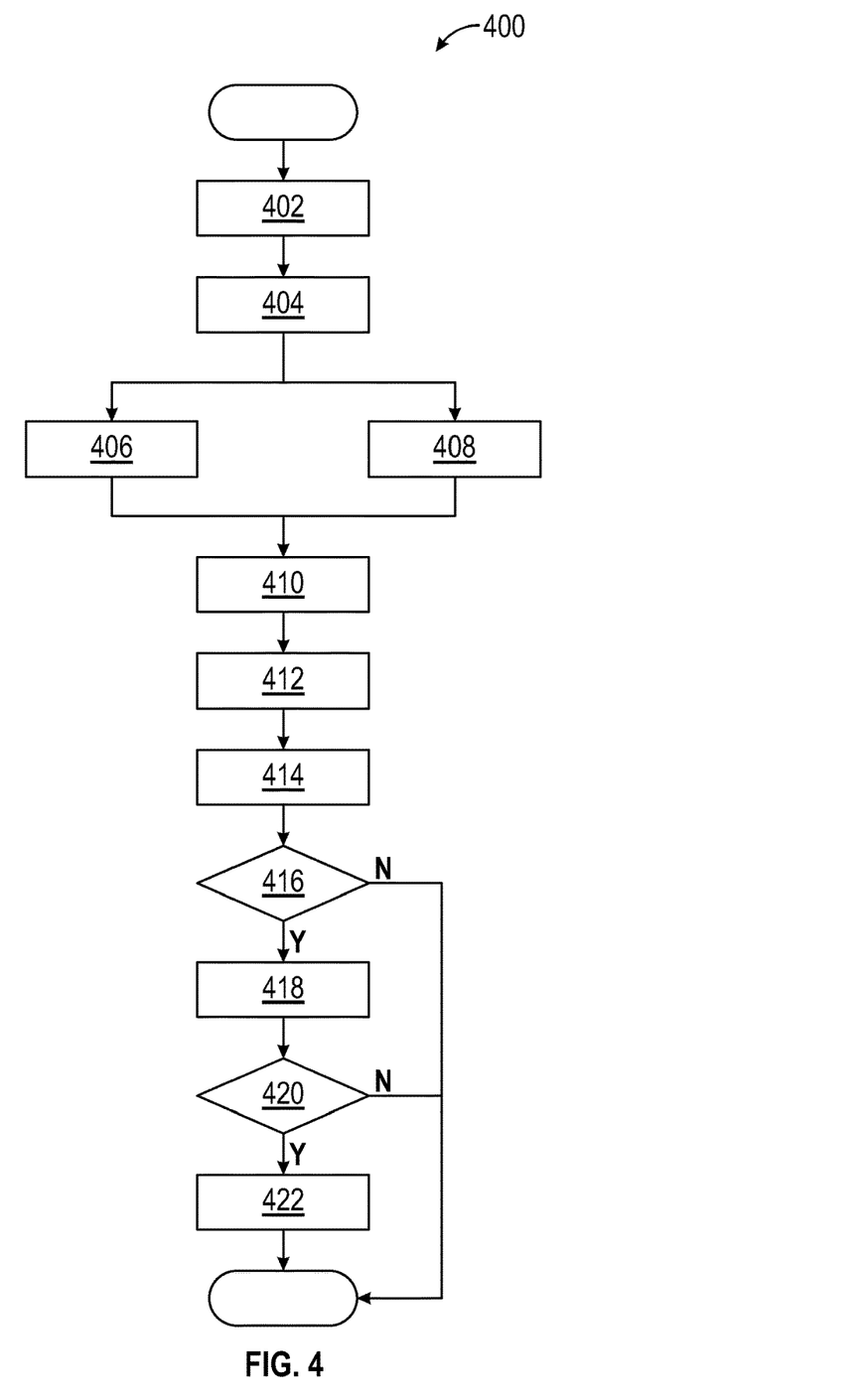
FIG. 4 is a process flow diagram illustrating yet another method for authenticating messages from the private communication system to the public communication system shown in FIG. 1, according to an exemplary embodiment.

FIG. 4 is an exemplary process flow diagram illustrating yet another method 400 for authenticating messages received by the public communication system 24 from the private communication system 22. Referring generally to FIGS. 1 and 4, the method 400 may begin at block 402. In block 402, the one or more computing devices C of the security proxy node 32 computes a random hash of a random message based on a trapdoor hash function. The random message may be, for example, a random number. The random hash is equal to a cryptographic hash of a concatenation of one or more unique messages transmitted by one of the private nodes 26 to the one or more receiving nodes 36 and padding information. That is, the random hash has is identical to the cryptographic hash of the concatenation of the one or more unique messages and the padding information. It is to be appreciated that a public node 30 does not know if the random hash is based on a random message, or if the random hash was computed based on a real message. It is also to be appreciated that a trapdoor key for the cryptographic hash is stored in memory of the private node 26 that transmits the unique messages to the one or more receiving nodes 36. The private node 26 computes the padding information based on the trapdoor key, where the cryptographic hash of the concatenation of the one or more unique messages transmitted by the one or more private nodes 26 and the padding information is equal to the random hash. Computing the padding information is described in block 410.

It is to be appreciated that in block 402, the security proxy node 32 may compute more than one hash of a random message or number, where each random hash corresponds to an instance when one of the private nodes 26 that are part of the private communication system 22 transmit one or more unique message over vehicle network 20. The method 400 may then proceed to block 404.

In block 404, the security proxy node 32 determines a message authentication code for the random hash. Specifically, the security module SM of the security proxy node 32 determines the message authentication code for the random hash. The one or more computing devices C of the security proxy node 32 obtains the message authentication code for the random hash from the security module SM of the security proxy node 32. The method 400 may then proceed to block 406.

In block 406, the security proxy node 32 transmits both the random hash and the message authentication code for the random hash over the public communication system 24 to the one or more receiving nodes 36. As mentioned above, the switch S of the security proxy node 32 transmits the message authentication code for the random hash over the public communication system 24 to the switch S corresponding to the one or more receiving nodes 36, and the switch S of the one or more receiving nodes 36 allows the message authentication code for the random hash to be available to the one or more computing devices C of the one or more receiving nodes 36. The method 400 may then proceed to block 408. It is to be appreciated that blocks 406 and 408 may be executed in parallel with one another.

In block 408, the security proxy node 32 transmits the random hash to one of the private nodes 26 that are part of the private communication system 22. It is to be appreciated that the private node 26 transmits one or more unique messages to the one or more receiving nodes 26. Although method 400 illustrates blocks 406 and 408 executed in parallel, in another embodiment the security proxy node 32 transmits the random hash and the message authentication code for the random hash to only the private node 26. The private node 26 may then compute the padding information and transmits the padding information along with the one or more unique messages and the message authentication code for the random hash to the one or more receiving nodes 36 via the switch S of the security proxy node 32. The method 400 may then proceed to block 410.

In block 410, the private node 26 computes the padding information based on the trapdoor key, where the padding information is selected to make the cryptographic hash equal to the random hash that was computed by the security proxy node 32 in block 402. That is, hash(m1||m2|| . . . | mn||P)= random hash, where P represents the padding information. The trapdoor key for the cryptographic hash allows for the private node 26 to compute the padding information so the cryptographic hash is equal to the random hash. In other words, the cryptographic hash is identical to the random hash. It is to be appreciated that each private node 26 of the private communication system 22 that transmits messages to the one or more receiving nodes 36 of the public communication system 24 stores a respective trapdoor key for the cryptographic hash stored in memory. The method 400 may then proceed to block 412.

In block 412, the private node 26 transmits the concatenation of the one or more unique messages and the padding information to the switch S of the one or more receiving nodes 36 via the switches S of the security proxy node 32 and the middle nodes 34 of the public communication system 24. The switch S of the one or more receiving nodes 36 then makes the concatenation of the one or more unique messages and the padding information available to the one or more computing devices C of the one or more receiving nodes 36. The method 400 may then proceed to block 414.

In block 414, the one or more computing devices C of the one or more receiving nodes 36 then determines a message cryptographic hash of the concatenation of the one or more unique messages and the padding information. The method 400 may then proceed to decision block 416.

In decision block 416, the one or more computing devices C of the one or more receiving nodes 36 compare the message cryptographic hash with the random hash. In response to determining the message cryptographic hash is not equal to the of the random hash, the one or more receiving nodes 36 determines the one or more unique messages are inconsumable, and the method 400 may terminate. However, in response to determining the value of the message cryptographic hash is equal to the value of the of the random hash, the method 400 may proceed to block 418.

In block 418, the one or more computing devices C of the one or more receiving nodes 36 determine if the message authentication code for the random hash is a valid message authentication code that originates from the security proxy node 32. The method 400 may then proceed to decision block 420.

In decision block 420, in response to determining the message authentication code for the random hash is not a valid message authentication code that originates from the security proxy node 32, the method 400 may terminate. However, in response to determining the message authentication code for the random hash is a valid message authentication code that originates from the security proxy node 32, the method 400 proceeds to block 422.

In block 422, the one or more computing devices C of the one or more receiving nodes 36 consumes the one or more unique messages. The method 200 may then terminate.

It is to be appreciated that the approach described by method 400 may also be employed in applications with relatively stringent latency requirements, such as distributed real-time control algorithms. It is to be appreciated that the trapdoor keys stored in the private nodes 26 are sensitive assets, and therefore are protected against outside sources.

The private nodes 26 and the public nodes 30 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A message authentication system for a vehicle network, the message authentication system comprising:
   a private communication system including one or more private nodes in electronic communication with one another; and
   a public communication system including a plurality of public nodes in electronic communication with one another, wherein the one or more private nodes and the plurality of public nodes are both implemented as hardware, and wherein the plurality of public nodes includes a security proxy node and one or more receiving nodes, the message authentication system performing the following:
      compute, by a private node that is part of the private communication system, a cryptographic hash corresponding to one or more unique messages, wherein the cryptographic hash and the one or more unique messages are transmitted to the security proxy node;
      transmit, by the security proxy node, the one or more unique messages to the one or more receiving nodes;
      determine, by the security proxy node, a message authentication code for the cryptographic hash;
      transmit, by the security proxy node, a concatenation of the cryptographic hash and the message authentication code for the cryptographic hash to the one or more receiving nodes; and
      consume, by the one or more receiving nodes, the one or more unique messages in response to determining the message authentication code for the cryptographic hash is valid and confirming the cryptographic hash is the correct hash value of the one or more unique messages received.

2. The message authentication system of claim 1, wherein the message authentication system determines the message authentication code for the cryptographic hash is valid by:
   determining, by the one or more receiving nodes, the message authentication code for the cryptographic hash is a valid message authentication code that originates from the security proxy node.

3. The message authentication system of claim 2, wherein the message authentication system performs the following:
   in response to determining the message authentication code for the cryptographic hash is a valid message authentication code that originates from the security proxy node, compare, by the one or more receiving nodes, the message authentication code for the cryptographic hash against the one or more unique messages to confirm the message authentication code for the cryptographic hash and the one or more unique messages correspond to one another.

4. The message authentication system of claim 1, wherein the message authentication system performs the following:
   transmit, by a switch of the security proxy node, the one or more unique messages over the public communication system to a switch corresponding to the one or more receiving nodes; and
   allow, by a switch of the one or more receiving nodes, the one or more unique messages to be available to one or more computing devices of the one or more receiving nodes.

5. The message authentication system of claim 1, wherein the security proxy node determines the message authentication code for the cryptographic hash by:
   making the cryptographic hash available to one or more computing devices of the security proxy node by a corresponding switch; and
   determining, by a security module of the security proxy node, the message authentication code for the cryptographic hash, wherein the one or more computing devices of the security proxy node obtains the message authentication code for the cryptographic hash from the security module of the security proxy node.

6. The message authentication system of claim 1, wherein the one or more private nodes lack support for message authentication.

7. The message authentication system of claim 1, wherein the one or more private nodes include one or more of the following: a smart actuator, a smart sensor, and an electronic control unit with an input/output (I/O) interface.

8. A message authentication system for a vehicle network, the message authentication system comprising:
a private communication system including one or more private nodes in electronic communication with one another, wherein the one or more private nodes include one or more of the following: a smart actuator, a smart sensor, and an electronic control unit with an I/O interface; and
a public communication system including a plurality of public nodes in electronic communication with one another, wherein the one or more private nodes and the plurality of public nodes are both implemented as hardware, and wherein the plurality of public nodes includes a security proxy node and one or more receiving nodes, the message authentication system performing the following:
compute, by a private node that is part of the private communication system, a cryptographic hash corresponding to one or more unique messages, wherein the cryptographic hash and the one or more unique messages are transmitted to the security proxy node;
transmit, by the security proxy node, the one or more unique messages to the one or more receiving nodes;
determine, by the security proxy node, a message authentication code for the cryptographic hash;
transmit, by the security proxy node, a concatenation of the cryptographic hash and the message authentication code for the cryptographic hash to the one or more receiving nodes; and
consume, by the one or more receiving nodes, the one or more unique messages in response to determining the message authentication code for the cryptographic hash is valid and confirming the cryptographic hash is the correct hash value of the one or more unique messages received.

9. The message authentication system of claim 8, wherein the message authentication system determines the message authentication code for the cryptographic hash is valid by:
determining, by the one or more receiving nodes, the message authentication code for the cryptographic hash is a valid message authentication code that originates from the security proxy node.

10. The message authentication system of claim 9, wherein the message authentication system performs the following:
in response to determining the message authentication code for the cryptographic hash is a valid message authentication code that originates from the security proxy node, compare, by the one or more receiving nodes, the message authentication code for the cryptographic hash against the one or more unique messages to confirm the message authentication code for the cryptographic hash and the one or more unique messages correspond to one another.

11. The message authentication system of claim 8, wherein the message authentication system performs the following:

transmit, by a switch of the security proxy node, the one or more unique messages over the public communication system to a switch corresponding to the one or more receiving nodes; and
allow, by a switch of the one or more receiving nodes, the one or more unique messages to be available to one or more computing devices of the one or more receiving nodes.

12. The message authentication system of claim 8, wherein the security proxy node determines the message authentication code for the cryptographic hash by:
making the cryptographic hash available to one or more computing devices of the security proxy node by a corresponding switch; and
determining, by a security module of the security proxy node, the message authentication code for the cryptographic hash, wherein the one or more computing devices of the security proxy node obtains the message authentication code for the cryptographic hash from the security module of the security proxy node.

13. The message authentication system of claim 8, wherein the one or more private nodes lack support for message authentication.

14. A message authentication system for a vehicle network, the message authentication system comprising:
a private communication system including one or more private nodes in electronic communication with one another, wherein the one or more private nodes lack support for message authentication; and
a public communication system including a plurality of public nodes in electronic communication with one another, wherein the one or more private nodes and the plurality of public nodes are both implemented as hardware, and wherein the plurality of public nodes includes a security proxy node and one or more receiving nodes, the message authentication system performing the following:
compute, by a private node that is part of the private communication system, a cryptographic hash corresponding to one or more unique messages, wherein the cryptographic hash and the one or more unique messages are transmitted to the security proxy node;
transmit, by the security proxy node, the one or more unique messages to the one or more receiving nodes;
determine, by the security proxy node, a message authentication code for the cryptographic hash;
transmit, by the security proxy node, a concatenation of the cryptographic hash and the message authentication code for the cryptographic hash to the one or more receiving nodes; and
consume, by the one or more receiving nodes, the one or more unique messages in response to determining the message authentication code for the cryptographic hash is valid and confirming the cryptographic hash is the correct hash value of the one or more unique messages received.

15. The message authentication system of claim 14, wherein the message authentication system determines the message authentication code for the cryptographic hash is valid by:
determining, by the one or more receiving nodes, the message authentication code for the cryptographic hash is a valid message authentication code that originates from the security proxy node.

16. The message authentication system of claim 15, wherein the message authentication system performs the following:

in response to determining the message authentication code for the cryptographic hash is a valid message authentication code that originates from the security proxy node, compare, by the one or more receiving nodes, the message authentication code for the cryptographic hash against the one or more unique messages to confirm the message authentication code for the cryptographic hash and the one or more unique messages correspond to one another.

17. The message authentication system of claim 14, wherein the message authentication system performs the following:

transmit, by a switch of the security proxy node, the one or more unique messages over the public communication system to a switch corresponding to the one or more receiving nodes; and allow, by a switch of the one or more receiving nodes, the one or more unique messages to be available to one or more computing devices of the one or more receiving nodes.

18. The message authentication system of claim 14, wherein the security proxy node determines the message authentication code for the cryptographic hash by:

making the cryptographic hash available to one or more computing devices of the security proxy node by a corresponding switch; and determining, by a security module of the security proxy node, the message authentication code for the cryptographic hash, wherein the one or more computing devices of the security proxy node obtains the message authentication code for the cryptographic hash from the security module of the security proxy node.

19. The message authentication system of claim 14, wherein the one or more private nodes include one or more of the following: a smart actuator, a smart sensor, and an electronic control unit with an I/O interface.

* * * * *